May 10, 1955  J. M. BRYANT ET AL  2,708,125
BEARING SEAL
Filed July 26, 1951
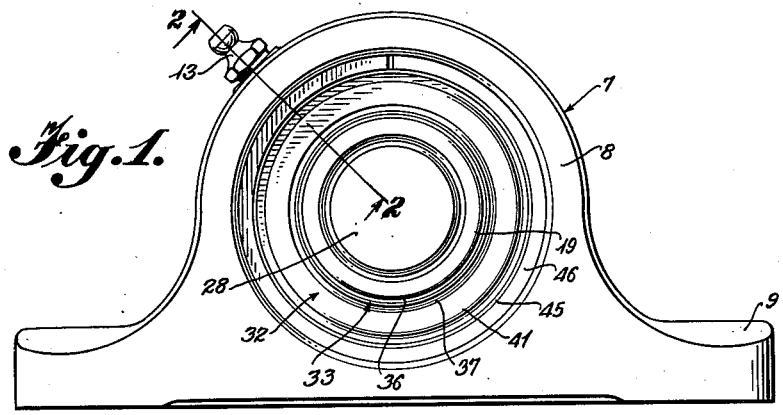
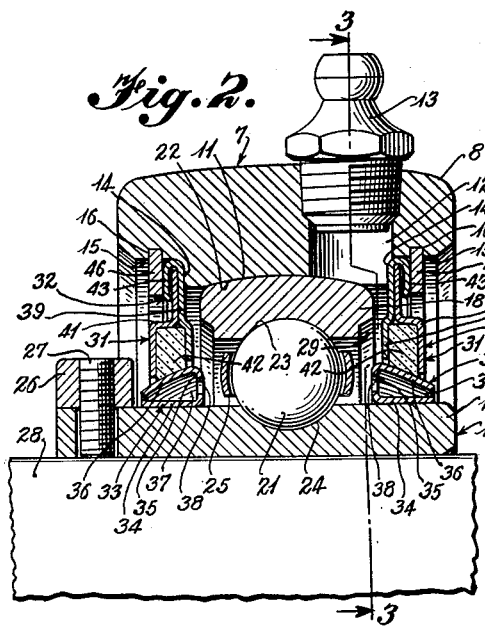
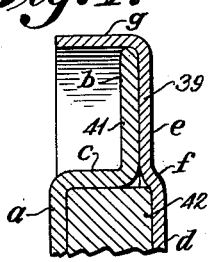
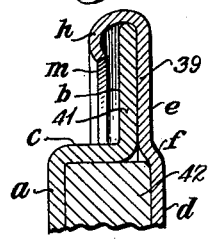
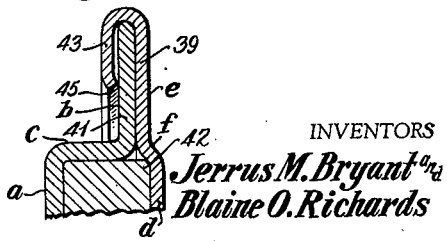
INVENTORS
Jerrus M. Bryant and
Blaine O. Richards
BY
ATTORNEY

United States Patent Office 2,708,125
Patented May 10, 1955

2,708,125

BEARING SEAL

Jerrus M. Bryant and Blaine O. Richards, Indianapolis, Ind., assignors to Link-Belt Company, a corporation of Illinois Application July 26, 1951, Serial No. 238,716

7 Claims. (Cl. 286—5)

This invention relates to new and useful improvements in seals for bearings and deals more particularly with seals for anti-friction bearing units which are so mounted in housings as to permit limited universal movement of the units.

It is conventional practice in the production of bearing seals to form various parts or elements of the seals from strip metal stock by stamping or similar operations and to prefabricate at least one of the seal members from two or more of the parts so formed. These prefabricated members must be so mounted in bearing units as to coact with other members to provide bearing seals which will function properly during universal movements of the units.

One of the difficulties encountered in the use of the above type of prefabricated seal member is caused by the need for mounting the same so as to avoid any looseness which will allow relative axial movement to occur between the two coacting members. The practice most frequently employed is to seat one circumferential margin of the prefabricated seal member in a groove that is formed in the supporting portion of the bearing unit. The opposite side walls of such a mounting groove normally are located relative to each other to provide a space therebetween which is fixed and which must be at least equal to the overall thickness of the seal member margin which is positioned therein. Due to the normal variations found in the thickness of strip metal stock and the cumulative effect of such variations when two or more metal parts are superimposed to form the margin of the seal member, the overall thickness of the seal member margin may be substantially less than the space that is provided between the side walls of the groove. When such difference occurs, the seal member will be free to move axially in the groove with the result that the coacting surfaces of the seal members move either toward each other, which will increase the tightness of their engagement, or away from each other, which will provide a loose fit. Too tight a fit will cause serious seal drag and loss of power due to the increase in friction, while too loose a fit will allow the lubricant to escape and dirt to enter the bearing.

A further difficulty encountered in the use of bearing seals of the type which employ contacting seal members that partake of relative rotary movement is caused by the practice followed by most grease mechanics of attempting to apply grease to a bearing until the grease exudes at the seals. When bearings are equipped with seals that are fitted to a snugness of contact which effects the best sealing action, the above practice will cause grease pressure to be developed in the bearings. Such grease pressure is undesirable because it creases a drag which raises the bearing temperature. If grease is applied by one of the new type of high-volume, high-pressure guns, the pressure developed in the bearings may be great enough to burst their housings or to blow out or damage the seals.

It is the primary object of the invention to provide an improved bearing seal having stationary and rotatable members so mounted as to prevent relative axial movement therebetween and so formed as to relieve excess lubricant pressure.

Another important object of the invention is to provide a bearing seal including a prefabricated member formed with a margin for mounting between spaced radial surfaces in such a manner as to prevent axial movement of the member in the space.

Still another object of the invention is to provide a prefabricated bearing seal member, formed of strip metal parts, having a mounting margin of predetermined thickness despite slight variations in the thickness of the metal strips from which the parts are formed.

A further object of the invention is to provide a bearing seal which will relieve excess pressure in the lubricant chamber of the bearing.

Another object of the invention is to provide a bearing seal member which is constructed to effect venting of the bearing lubricant when excessive pressures are developed in the bearing while preventing the entrance of foreign matter into the bearing.

Other objects and advantages of the invention will be apparent during the course of the following description.

In the accompanying drawings forming a part of this specification and in which like numerals are employed to designate like parts throughout the same, Figure 1 is a side elevational view of a pillow block bearing and seal embodying the invention, Figure 2 is an enlarged sectional view taken on line 2—2 of Fig. 1, Figure 3 is a sectional view taken on line 3—3 of Fig. 2, Figure 4 is a fragmentary sectional view of the stationary seal member of the invention showing the relationship of its elements after their initial assembly step, Figure 5 is a similar view to Fig. 4 illustrating the relationship of the same seal elements after a subsequent step in their assembly, and Figure 6 is a similar view to Fig. 5 illustrating the relationship of the same seal elements when their assembly has been completed.

In the drawing, wherein for the purpose of illustration is shown a preferred embodiment of this invention, and first particularly referring to Figs. 1 to 3, inclusive, reference character 7 designates a pillow block bearing which includes the annular housing or strap portion 8 and the base portion 9. The bore of the housing 8 is formed with a spherical surface 11 and a radial aperture 12 extends through the housing at one side of the spherical surface to threadedly mount a lubricant fitting 13. On opposite sides of the housing 8 each edge of its bore is rabbeted to form a radial shoulder 14 and a circumferential surface 15. Each radial shoulder 14 is spaced axially outwardly of the adjacent edges of the spherical surface 11 and each circumferential surface 15 has formed therein a circumferential groove 16 which is spaced axially outwardly of the adjacent shoulder 14.

A bearing unit 17, including an outer race ring 18, an inner race ring 19 and a plurality of balls 21, is mounted in the housing 8 for universal movement by engagement between the spherical outer surface 22 of the outer race ring 18 and the spherical inner surface 11 of the housing 8. The opposed surfaces of the inner and outer race rings 18 and 19 are provided with grooves 23 and 24, respectively, forming a race for the balls 21 which are maintained in proper spaced relation by a cage 25. The inner race 19 is of proper axial dimension to provide portions extending axially outwardly beyond the opposite sides of the outer race ring 18 and arranged radially inwardly of the rabbeted edges of the housing bore. One end portion of the inner race ring 19 is provided with a collar 26 and set screw 27 for fastening the inner race ring to a rotating shaft 28, or the like.

A lubricant chamber 29 is formed between the bore surface of the housing 8 and the outer surface of the inner race ring 19 by seal units 31 which are mounted on opposite sides of the bearing unit 17 and extend between the housing 8 and the inner race ring 19. Each seal unit 31 is formed of a prefabricated, annular stationary seal assembly 32 mounted within the housing 8 and an annular, rotating seal member 33 that is press fitted on the inner race ring 19.

Each annular, rotating seal member 33 preferably is stamped from strip steel and is properly shaped to provide an inner cylindrical base flange 34 having a wall or web 35 projecting radially from its inner edge with a peripheral flange 36 projecting axially outwardly from the circumference of the wall or web 35 and radially inwardly toward the outer edge of the base flange 34. By inspecting Fig. 2, it will be seen that the peripheral flange 36 is transversely curved to provide a spherical outer surface having the same center as the spherical surfaces 11 and 22 of the housing 8 and the outer race ring 18, respectively. The peripheral flange 36 has its free edge so positioned relative to the outer edge of the base flange 34 as to leave a narrow slot or opening for the annular chamber 37 that is formed by the wall or web 35 and the two flanges 34 and 36. The wall or web 35 is provided with a series of apertures 38 which provide communication between the annular chamber 37 and the lubricant chamber 29 that is formed between the seal units 31.

Each of the stationary annular seal assemblies 32 is prefabricated from a steel inner seal ring 39, a steel outer seal ring 41 and a packing ring 42 formed of felt, or other suitable material. In its final form, the peripheral portions of the outer and inner seal rings are clamped together by the bent over marginal flange 43 of the inner ring 39 with its inwardly curved free edge portion 45 contacting and gripping the associated portion of the outer ring.

Referring now specifically to Fig. 6 for a detail description of the structural formations of the two seal rings, it will be seen that the outer seal ring 41 consists of a radial inner wall portion *a* that is joined to a radial marginal flange portion *b* by a cylindrical web portion *c* so that the wall and flange portions are offset from each other, or are arranged in parallel planes. The inner seal ring 39 consists of a radial inner wall portion *d* that is joined to a radial marginal band *e* by a narrow offset or reverse bend *f* so that the wall portion and band are arranged in parallel planes. Outwardly of the band *e*, the inner seal ring is bent over to form the previously referred to marginal flange 43 which has its free edge portion 45 curved laterally inwardly to provide a gripping edge.

The method steps employed for prefabricating the seal assembly 32 are illustrated in Figs. 4 to 6, inclusive. As initially formed, the inner ring 39 is provided with a right-angularly arranged flange *g* at its periphery. This formation permits the outer seal ring 41 and the packing ring 42 to be associated with the inner ring 39, as illustrated in Fig. 4. The next step consists of curling the flange *g* of Fig. 4 over the peripheral edge of the outer ring flange *b* and into the curved shape *h* of Fig. 5 in which the free edge *m* is directed inwardly toward the face of the outer ring flange *b*. The last step consists of further folding the curved portion *h* of Fig. 5 downwardly about the outer ring flange *b* and into the final shape of the flange 43, see Fig. 6, with the free edge 45 engaging the outer ring flange *b* to permanently clamp the two seal rings together.

It will be seen that the intermediate portion of the flange 43 is somewhat spaced from and is arranged in parallelism with the radial marginal flange *b* of the outer seal ring. This arrangement provides the peripheral margin of the seal assembly 32 with an overall thickness that is greater than the sum of the thicknesses of the outer ring flange *b* and the two portions *e* and 43 of the inner ring 39. This overall thickness of the seal assembly can be held to an accurate dimension regardless of any normal variations that may be encountered in the thickness of the steel strip from which the seal rings are stamped.

After the stationary seal 32 has been fabricated as above described, it is positioned in the housing 8 with the inner ring 39 engaging the radial shoulder 14. A split ring 45 then is positioned in the groove 16 formed in the circumferential surface 15 of the housing 8 to engage the outer face of the flange 43. The peripheral mounting margin of the stationary seal assembly 32 is thereby held against axial movement in the groove, formed between opposed radial faces of the split ring 45 and the shoulder 14, by the accurate spacing of the groove 16 from the shoulder 14 and the accurately controlled overall thickness of the mounting margin of the seal assembly.

The relative positioning of the rotating and stationary seals 33 and 32, respectively, is such that the inner face of the packing ring 42 will engage the spherical outer face of the peripheral flange 36 of the rotating ring to provide sealing engagement therebetween during both rotary and universal movements of the bearing elements.

It, also, will be noted that the radial bore 12 and its lubricant fitting 13 are in direct communication with the lubricant chamber 29 and that any excess grease pressure in the chamber 29 will be relieved by venting of the grease through the apertures 38 in the rotating seal 33 and the restricted opening between the free edges of the base 34 and flange 36. The restricted venting opening for the grease chamber 37 and the presence of lubricant in said chamber will prevent the admission of any foreign matter into the lubricant chamber 29.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described the invention, we claim:

1. An anti-friction bearing seal positioned between a stationary member and a rotatable member, comprising said stationary member having a rabbeted edge to provide an annular radial shoulder and a circumferential surface, said surface having a continuous groove therein spaced axially from said shoulder, an annular member mounted in said groove and having a radial surface opposing said radial shoulder to provide a mounting space of a given width therebetween, a seal assembly having its peripheral margin positioned in the aforesaid mounting space, said seal assembly including an inner ring and an outer ring having their radially inner portions spaced apart and an annular packing ring positioned between siad spaced portions, said inner ring having an edge portion folded around but spaced from the peripheral portion of the outer ring to form a radially inwardly directed flange with the free edge of said flange bent laterally inwardly to clamp said outer ring against the body of said inner ring, the peripheral mounting margin of said seal assembly, which includes said folded edge portion, having a given overall thickness substantially equal to the width of said mounting space to prevent axial movement of the seal assembly, and a seal member formed with a cylindrical base flange press fitted onto the rotatable member, an annular web having circumferentially spaced apertures therethrough connected to said base flange and extending outwardly therefrom, and a peripheral flange connected to the periphery of said web and engaging said packing ring, said peripheral flange extending laterally arcuately into closely spaced relationship with said base flange to form a restricted outer opening therebetween.

2. An anti-friction bearing seal positioned between a stationary member and a rotatable member, comprising said stationary member having a rabbeted edge to provide an annular radial shoulder and a circumferential surface, said surface having a continuous groove therein spaced axially from said shoulder, an annular member removably mounted in said groove and having a radial surface opposing said radial shoulder to provide a mounting space of a given width therebetween, a seal assembly having its peripheral margin positioned in the aforesaid mounting space, said seal assembly including a pair of rings having their inner portions spaced apart and an annular packing ring positioned between said spaced portions, one of said rings having an edge portion folded around but spaced from the peripheral portion of the other ring to form a radially inwardly directed flange with the free edge of said flange bent laterally inwardly to clamp said other ring against the body of said first mentioned ring, the peripheral mounting margin of said seal assembly, which includes said folded portion, having a given overall thickness substantially equal to the width of said mounting space to prevent axial movement of the seal assembly, and a seal member formed with a cylindrical base flange press fitted onto the rotatable member, an anular web, having circumferentially spaced apertures therethrough, connected to the axially inner edge of said base flange and extending radially outwardly therefrom, and a peripheral flange connected to the periphery of said web and engaging said packing ring, said peripheral flange extending arcuately from the web into closely spaced relationship with a portion of said base flange to form a restricted opening therebetween, said flanges and web forming a chamber therebetween.

3. An anti-friction bearing seal positioned between a stationary member and a rotatable member, comprising said rotatable member having a cylindrical peripheral surface, an annular hollow seal member having a cylindrical bore surface press fitted onto the peripheral surface of the rotatable member, and a spherical peripheral surface, said annular seal member, between said bore and peripheral surfaces, on one side having a series of apertures for admitting grease to the interior of the seal member and on the other side having a narrow annular slot which is so restricted in width as to prevent the release of grease therethrough until the grease in the interior of the seal member is subjected to excessive pressure through said apertures, an annular seal assembly including a pair of rings having inner portions spaced apart and outer portions in clamped face-to-face contact, the said outer portion of one of the rings having a peripheral flange folded over and spaced laterally from the said outer portion of the other ring to provide a peripheral mounting margin of a given thickness, said stationary member having means forming an annular space to receive and of a width substantially equal to the overall thickness of the peripheral mounting margin of the seal assembly to prevent axial movement thereof, and a packing ring positioned between the spaced apart portions of the said rings and engaging the spherical peripheral surface of said annular hollow seal member.

4. In an anti-friction bearing seal positioned between a stationary member and a rotatable member having a lubricant receiving space therebetween, the improvement which comprises a seal member having an unobstructed chamber therein to be filled with grease, said seal member being formed by a cylindrical base flange press fitted onto the rotatable member, an annular web connected to said base flange and extending outwardly therefrom, said web having circumferentially spaced apertures therethrough which are fully exposed to said lubricant receiving space for admitting grease to said chamber and a peripheral flange connected to the periphery of said web and extending laterally arcuately into closely spaced relationship with said base flange to form a slot therebetween which is so restricted in size as to prevent the release of grease therethrough until the grease in the chamber is subjected to excessive pressure applied through said apertures.

5. In an anti-friction bearing seal positioned between a stationary member and a rotatable member having a lubricant receiving space therebetween, the improvement which comprises a seal member having an unobstructed chamber therein to be filled with grease, said seal member being formed by a cylindrical base flange press fitted onto the rotatable member, an annular web, connected to one edge of said base flange and extending outwardly therefrom, said web having circumferentially spaced apertures therethrough which are fully exposed to said lubricant receiving space for admitting grease to said chamber, and a peripheral flange connected to and extending arcuately from the periphery of said web portion into closely spaced relationship with a portion of said base flange to form an annular slot therebetween which is so restricted in width as to prevent the release of grease therethrough until the grease in the chamber is subjected to excessive pressure applied through said apertures.

6. An anti-friction bearing seal positioned between a stationary member and a rotatable member having a lubricant receiving space therebetween, comprising said stationary member having a rabbeted edge to provide an annular radial shoulder and a circumferential surface, a seal assembly mounted in engagement with the aforesaid radial shoulder and circumferential surface of the rabbeted edge and including an inner ring and an outer ring having their radial inner portions spaced apart and an annular packing ring between said spaced portions, and a seal member having an unobstructed chamber therein to be filled with grease and being formed with a cylindrical base flange fitted onto the rotatable member, and an annular web connected to said base flange and extending outwardly therefrom, said web having circumferentially spaced apertures therethrough which are fully exposed to said lubricant receiving space from admitting grease to said chamber, and a peripheral flange connected to the periphery of said web and engaging said packing ring, said peripheral flange extending laterally arcuately into closely spaced relationship with said base flange to form a restricted outer opening therebetween which is so restricted in size as to prevent the release of grease therethrough until the grease in the chamber is subjected to excessive pressure applied through said apertures.

7. An anti-friction bearing seal positioned between a stationary member and a rotatable member having a lubricant receiving space therebetween, comprising said rotatable member having a cylindrical peripheral surface, an annular hollow seal member providing an unobstructed chamber therein to be filled with grease and having a cylindrical base flange press fitted onto the peripheral surface of the rotatable member, a spherical peripheral flange, and an annular web connected between said base flange and said peripheral flange, said web having a series of apertures formed therethrough which are fully exposed to said lubricant receiving space for admitting grease to the chamber of the seal member, the free edges of said peripheral flange and base flange extending into such closely spaced relationship as to form a narrow annular slot which is so restricted in width as to prevent the release of grease therethrough until the grease in the chamber of the seal member is subjected to excessive pressure applied through said apertures, an annular seal assembly including a pair of rings having inner portions spaced apart and outer portions clamped in face-to-face contact, the said outer portion of one of the rings forming a flange to provide a peripheral mounting margin, said stationary member having means forming a rabbeted edge to receive the peripheral mounting margin of the seal assembly, and a packing ring positioned between the spaced apart portions of said rings and engaging the spherical peripheral flange of said annular hollow seal member.

References Cited in the file of this patent

UNITED STATES PATENTS

| | | |
|---|---|---|
| 1,420,416 | Dlesk | June 20, 1922 |
| 1,583,562 | Stenner | May 4, 1926 |
| 1,917,988 | Large | July 11, 1933 |
| 2,038,293 | Jacob | Apr. 21, 1936 |
| 2,266,175 | Delaval-Crow | Dec. 16, 1941 |
| 2,320,794 | Pew | June 1, 1943 |
| 2,590,422 | Large | Mar. 25, 1952 |
| 2,591,129 | Brouwer | Apr. 1, 1952 |

FOREIGN PATENTS

| | | |
|---|---|---|
| 47,555 | Sweden | of 1918 |